US 7,707,214 B2

(12) United States Patent
Monro

(10) Patent No.: US 7,707,214 B2
(45) Date of Patent: *Apr. 27, 2010

(54) HIERARCHICAL UPDATE SCHEME FOR EXTREMUM LOCATION WITH INDIRECT ADDRESSING

(76) Inventor: Donald Martin Monro, 6, The Lays, Goose Street, Beckington, Somerset BA11 6RS (GB)

( * ) Notice: Subject to any disclaimer, the term of this patent is extended or adjusted under 35 U.S.C. 154(b) by 272 days.

This patent is subject to a terminal disclaimer.

(21) Appl. No.: 11/677,515

(22) Filed: Feb. 21, 2007

(65) Prior Publication Data

US 2008/0201346 A1    Aug. 21, 2008

(51) Int. Cl.
*G06F 7/00* (2006.01)

(52) U.S. Cl. .............................. 707/737; 707/E17.002; 375/E7.203

(58) Field of Classification Search ......... 707/100–101, 707/102, E17.005, 791, E17.002; 375/E7.203
See application file for complete search history.

(56) References Cited

U.S. PATENT DOCUMENTS

| 4,168,513 | A | 9/1979 | Hains et al. |
| 4,509,038 | A | 4/1985 | Hirano |
| 4,675,809 | A | 6/1987 | Omoda |
| 4,908,873 | A | 3/1990 | Philbert et al. |
| 5,218,435 | A | 6/1993 | Lim et al. |
| 5,315,670 | A | 5/1994 | Shapiro |
| 5,321,776 | A | 6/1994 | Shapiro |
| 5,412,741 | A | 5/1995 | Shapiro |
| 5,559,931 | A | 9/1996 | Shindou et al. |
| 5,699,121 | A | 12/1997 | Zakhor et al. |
| 5,748,786 | A | 5/1998 | Zandi et al. |
| 5,754,704 | A | 5/1998 | Barnsley et al. |
| 5,768,437 | A | 6/1998 | Monro et al. |
| 5,819,017 | A | 10/1998 | Akeley et al. |
| 5,873,076 | A | 2/1999 | Barr et al. |
| 5,956,429 | A | 9/1999 | Burns |
| 6,029,167 | A | 2/2000 | Evans |
| 6,052,416 | A | 4/2000 | Koga |

(Continued)

FOREIGN PATENT DOCUMENTS

EP    0 595 599 A2    5/1994

(Continued)

OTHER PUBLICATIONS

International Search Report for Patent Cooperation Treaty Appln. No. PCT/US2007/019034 issued Apr. 8, 2008, 2pgs.

(Continued)

*Primary Examiner*—Tim T. Vo
*Assistant Examiner*—Shiow-Jy Fan
(74) *Attorney, Agent, or Firm*—Sterne, Kessler Goldstein & Fox P.L.L.C.

(57) ABSTRACT

A system and method for determining an extreme value of data in various applications including audio, video and image encoding schemes. The system and method are used to generate a hierarchical data structure by partitioning the data values and then generating a hierarchy using indices of these data values, with the apex containing the index of the extreme value. The system and method allow for changes in the data values in the base level of the hierarchy to result in the ripple through of the indices to the apex in an efficient manner.

61 Claims, 6 Drawing Sheets

U.S. PATENT DOCUMENTS

| | | | |
|---|---|---|---|
| 6,078,619 | A | 6/2000 | Monro et al. |
| 6,086,706 | A | 7/2000 | Brassil et al. |
| 6,125,348 | A | 9/2000 | Levine |
| 6,144,835 | A | 11/2000 | Inoue |
| 6,208,744 | B1 | 3/2001 | Ishige et al. |
| 6,336,050 | B1* | 1/2002 | Amin et al. ............... 700/28 |
| 6,434,542 | B1* | 8/2002 | Farmen et al. ............. 706/45 |
| 6,480,547 | B1* | 11/2002 | Chen et al. ........... 375/240.27 |
| 6,556,719 | B1 | 4/2003 | Monro |
| 6,625,213 | B2* | 9/2003 | Bottreau et al. ....... 375/240.08 |
| 6,654,503 | B1 | 11/2003 | Sudharsanan et al. |
| 6,820,079 | B1 | 11/2004 | Evans |
| 6,847,966 | B1 | 1/2005 | Sommer et al. |
| 6,990,142 | B2 | 1/2006 | Chappaz |
| 6,990,145 | B2 | 1/2006 | Monro et al. |
| 7,003,039 | B2 | 2/2006 | Zakhor et al. |
| 7,079,986 | B2 | 7/2006 | Sieracki |
| 7,230,551 | B2 | 6/2007 | Moriya et al. |
| 2002/0069206 | A1* | 6/2002 | Bergman et al. ........... 707/100 |
| 2003/0108101 | A1* | 6/2003 | Frossard et al. ....... 375/240.03 |
| 2004/0028135 | A1 | 2/2004 | Monro |
| 2004/0126018 | A1 | 7/2004 | Monro |
| 2004/0165737 | A1 | 8/2004 | Monro |
| 2004/0218836 | A1 | 11/2004 | Kanatsu |
| 2005/0149296 | A1 | 7/2005 | Sieracki |
| 2007/0016414 | A1 | 1/2007 | Mehrotra et al. |
| 2007/0030177 | A1 | 2/2007 | Monro |
| 2007/0053434 | A1 | 3/2007 | Monro |
| 2007/0053597 | A1 | 3/2007 | Monro |
| 2007/0053603 | A1 | 3/2007 | Monro |
| 2007/0164882 | A1 | 7/2007 | Monro |
| 2007/0252733 | A1 | 11/2007 | Thebault et al. |
| 2007/0258654 | A1 | 11/2007 | Monro |
| 2007/0282933 | A1 | 12/2007 | Monro |
| 2007/0290898 | A1 | 12/2007 | Monro |
| 2007/0290899 | A1 | 12/2007 | Monro |
| 2008/0005648 | A1 | 1/2008 | Monro |
| 2008/0055120 | A1 | 3/2008 | Monro |
| 2008/0056346 | A1 | 3/2008 | Monro |
| 2008/0084924 | A1 | 4/2008 | Monro |
| 2008/0086519 | A1 | 4/2008 | Monro |

FOREIGN PATENT DOCUMENTS

| | | |
|---|---|---|
| EP | 0 836 325 A1 | 4/1998 |
| EP | 1 545 010 A1 | 6/2005 |
| EP | 1 610 560 A | 12/2005 |
| GB | 2 293 733 A | 4/1996 |
| GB | 2 409 943 A | 7/2005 |
| WO | WO 97/16029 | 5/1997 |
| WO | WO98/11730 | 3/1998 |
| WO | WO99/08449 | 2/1999 |
| WO | WO01/15456 | 3/2001 |
| WO | WO01/63935 | 8/2001 |
| WO | WO02/13538 | 2/2002 |
| WO | WO2004/051863 | 6/2004 |
| WO | WO2005/027049 | 3/2005 |
| WO | WO 2005/064799 | 7/2005 |
| WO | WO 2005/067661 | 7/2005 |
| WO | WO2005/119581 | 12/2005 |
| WO | WO2007/030702 | 3/2007 |
| WO | WO2007/030784 | 3/2007 |
| WO | WO2007/030785 | 3/2007 |
| WO | WO2007/030788 | 3/2007 |
| WO | WO 2007/084336 | 7/2007 |
| WO | WO 2007/118220 | 10/2007 |
| WO | WO 2007/145875 | 12/2007 |
| WO | WO 2007/149358 | 12/2007 |
| WO | WO 2007/149383 | 12/2007 |
| WO | WO 2007/149384 | 12/2007 |
| WO | WO 2008/027450 | 3/2008 |
| WO | WO 2008/030426 | 3/2008 |
| WO | WO/2008/045280 | 4/2008 |
| WO | WO/2008/045281 | 4/2008 |

OTHER PUBLICATIONS

Written Opinion for Patent Cooperation Treaty Appln. No. PCT/US2007/019034 completed Mar. 31, 2008, mailed Apr. 8, 2008, 7pgs.

Non-Final Rejection for U.S. Appl. No. 11/470,611, mailed on Jun. 30, 2008, 5 pgs.

Non-Final Rejection for U.S. Appl. No. 11/422,316, mailed on Jul. 3, 2008, 7 pgs.

Final Office Action for U.S. Appl. No. 11/332,777, mailed Aug. 13, 2008, 5 pgs.

Final Office Action for U.S. Appl. No. 11/255,090, mailed Sep. 3, 2008, 11 pgs.

Non-Final Office Action for U.S. Appl. No. 11/425,142, mailed Sep. 16, 2008, 12 pgs.

Brin et al., Copy detection mechanisms for digital documents, Proceedings of the 1995 ACM SIGMOD international conference on Management of data SIGMOD '95, Volumer 24 ACM Press, May 1995, pp. 398-409.

Cancedda et al., Word Sequence Kernels, Mar. 2003, MIT Press, Journal of Machine Learning Research, vol. 3 Special Edition, pp. 1059-1082.

Cover et al. "Elements of Information Theory" Copyright Jon Wiley & Sons, Inc., p. 96, 1991.

De Natale, et al., "A Mesh-Interpolation Scheme for Very-Low Bitrate Coding of Video Sequences" European Transactions on Telecommunications, vol. 9, No. 1, pp. 47-55, 1998.

De Vleeschouwer et al., "Subband dictionaries for low-cost matching pursuits of video residues," IEEE Transactions on Circuits and Systems for Video Technology, vol. 9, Issue 7, pp. 984-993, Oct. 1999.

Gamito et al. "Lossles Coding of Floating Point Data with JPEG 2000 Part 10" Proceedings of the SPIE, SPIE, Bellingham, VA, US. vol. 5558, Aug. 2, 2004. pp. 276-287.

Golomb, S.W., "Run-length encodings" IEEE Trans Info Theory, Jul. 1966, 12(3):399-401.

Horst et al. "Mupcos: A multi-purpose coding scheme" Signal Processing: Image Communication 5, pp. 75-89, 1993.

Hosang, M., "A Character Elimination Algorithm for Lossless Data Compression" Data Compression Conference, Proceedings. DCC, IEEE Computer Society Press, Los Alamitos, CA, US, Apr. 2, 2002, pp. 1-10.

Huffman, David A., "A Method for the Construction of Minimum-Redundancy Codes," Pro. Inst. Radio Eng., 1952, 9 (40), pp. 1098-1101.

Hull, Jonathan J., "Document Image Matching and Retrieval with Multiple Distortion-Invariant Descriptors", International Association for Pattern Recognition Workshop on Document Analysis Systems, Series in Machine Perception and Artificial Intelligence, vol. 14, published by World Scientific Publishing Co. Pte. Ltd. 1995, pp. 379-396.

Jun-peng Bao et al., "A new text feature extraction model and its application in document copy detection" Machine Learning and Cybernetics, 2003, International Conference on Nov. 2-5, 2003 Piscataway, NJ, USA, IEEE vol. 1, Nov. 2, 2003, pp. 82-87.

Larsson, N.J., "The Context Trees of Block Sorting Compression" In Proceedings of the IEEE Data Compression Conference, Snowbird, Utah, Mar. 30-Apr. 1, pp. 189-198. IEEE Computer Society Press, 1998.

Said et al., "A New, Fast, and Efficient Image Codec Based on Set Partitioning in Heirarchical Trees" IEEE Transactions on Circuits and Systems for Video Technology, vol. 6, No. 3, pp. 243-250, Jun. 1996.

Sayood, Khalid, "Introduction to Data Compression" Morgan Kaufmann Publishers Inc., San Francisco, CA, USA 1996, pp. 27-32.

Sayood, Khalid, "Introduction to Data Compression" Morgan Kaufmann Publishers Inc., San Francisco, CA, USA 1991, pp. 98-99.

Salomon, "Data Compression: the complete reference", Springer, pp. 32-33, 1998.

Schleimer et al., Data security protection: Winnowing: local algorithms for document fingerprinting, 2003 ACM SIGMOD international conference on Management of data (SIGMOD '03), ACM Press, Jun. 2003, pp. 76-85.

Teuhola, J. "A Compression Method for Clustered Bit-Vectors" Information Processing Letters, Amsterdam, NL, vol. 7, No. 6, pp. 308-311, Oct. 1978.

Tian et al., "Image Data Processing in the Compressed Wavelet Domain" Proceedings of ICSP'96, pp. 978-981, 1996.

Trott et al. "Wavelets Applied to Lossless Compression and Progressive Transmission of Floating Point Data in 3-D Curvilinear Grids" IEEE Proceedings of the Visualization Conference, Oct. 27, 1996, pp. 385-388.

Donald Monro, U.S. Appl. No. 11/677,515, filed Feb. 21, 2007, entitled "Hierarchical Update Scheme for Extremum Location with Indirect Addressing".

Donald Monro, U.S. Appl. No. 11/678,004, filed Feb. 22, 2007, entitled, "Video Coding With Motion Vectors Determined By Decoder".

Donald Monro, U.S. Appl. No. 11/678,479, filed Feb. 23, 2007, entitled, "Video Coding With Embedded Motion".

Donald Monro, U.S. Appl. No. 11/777,256, filed Jul. 11, 2007.

Donald Monro, U.S. Appl. No. 11/677,511, filed Feb. 21, 2007, entitled "Hierarchical Update Scheme For Extremum Location".

Donald Monro, U.S. Appl. No. 11/777,239, filed Jul. 12, 2007.
Donald Monro, U.S. Appl. No. 11/777,230, filed Jul. 12, 2007.
Donald Monro, U.S. Appl. No. 11/777,130, filed Jul. 12, 2007.
Donald Monro, U.S. Appl. No. 11/777,144, filed Jul. 12, 2007.
Donald Monro, U.S. Appl. No. 11/777,122, filed Jul. 12, 2007.
Donald Monro, U.S. Appl. No. 11/777,100, filed Jul. 12, 2007.
Donald Monro, U.S. Appl. No. 11/777,081, filed Jul. 12, 2007.
Donald Monro, U.S. Appl. No. 11/777,022, filed Jul. 12, 2007.
Donald Monro, U.S. Appl. No. 11/776,786, filed Jul. 12, 2007.

Donald Monro, PCT Serial No. PCT/US2007/008861, filed Apr. 9, 2007, entitled "Motion Assisted Data Enhancement".

Donald Monro, PCT Serial No. PCT/US2008/002100, filed Feb. 19, 2008, entitled "Hierarchical Update Scheme For Extremum Location".

Donald Monro, PCT Serial No. PCT/US2008/002101, filed Feb. 19, 2008, entitled "Hierarchical Update Scheme for Extremum Location with Indirect Addressing".

International Search Report for Appln. No. PCT/US2007/013100 issued Jan. 14, 2008, 4pgs.

International Search Report for Appln. No. PCT/US2007/000759 issued Feb. 14, 2008, 7pgs.

International Search Report for Appln. No. PCT/US2007/014138 issued Oct. 29, 2007, 2 pgs.

International Search Report for Appln. No. PCT/US2007/014182 issued Jan. 18, 2008, 1 pg.

International Search Report for Appln. No. PCT/US2007/014181 issued Jan. 14, 2008.

Non-Final Office Action for U.S. Appl. No. 11/255,090, completed Feb. 2, 2008, mailed Feb. 6, 2008, 14pgs.

Non-Final Office Action for U.S. Appl. No. 11/332,777, completed Dec. 12, 2007, mailed Dec. 21, 2007, 4pgs.

Final Office Action for U.S. Appl. No. 11/425,142, completed Sep. 10, 2007, mailed Sep. 18, 2007, 9 pgs.

Non-Final Office Action for U.S. Appl. No. 11/425,142, completed Mar. 7, 2007, mailed Mar. 20, 2007, 8 pgs.

Non-Final Office Action for U.S. Appl. No. 11/470,611, completed Aug. 29, 2007, mailed Sep. 5, 2007, 6 pgs.

Written Opinion for Appln. No. PCT/US2007/000759 completed Feb. 14, 2007, mailed Feb. 25, 2008, 11pgs.

U.S. Appl. No. 11/255,090, filed Oct. 19, 2005, Monro.

Monro et al., "Bases for Low Complexity Matching Pursuits Image Coding" www.http://dmsun4.bath.ac.uk.

Yuan et al., "Improved Matching Pursuits Image Coding" IEEE International Conference on Acoustics, Speech and Signal Processing ICASSP 2005, pp. II-201-II-204, Mar. 2005.

Monro, "Basis Picking for Matching Pursuits Image Coding" IEEE International Conference on Image Processing, pp. 2495-2498, Sep. 2004.

Yuan et al., "Low Complexity Separable Matching Pursuits" IEEE Int. Conference Acoustics Speech Signal Process, pp. III-725-III-728, May 2004.

Figueras et al., "Color Image Scalable Coding with Matching Pursuit" IEEE Int. Conference Acoustics Speech Signal Process, pp. III-53-56, May 2004.

Monro et al., "Improved Coding of Atoms in Matching Pursuits" IEEE Int. Conf. Image Process, vol. 2, Sep. 2003.

Frossard et al., "High Flexibility Scalable Image Coding" Proceedings of VCIP 2003, Jul. 2003.

Poh et al., "Comparison of Residual Compression Methods in Motion Compensated Video" IEEE Int. Workshop on Multimedia Signal Processing, pp. 109-112, Dec. 2002.

Moschetti et al., "New Dictionary and Fast Atom Searching Method for Matching Pursuit Representation of Displaced Frame Difference" IEEE International Conference on Image Processing, pp. III-685-688, Sep. 2002.

Neff et al., "Matching Pursuit Video Coding-Part I: Dictionary Approximation" IEEE Trans. Circuits System Video Technology, vol. 12, No. 1, pp. 13-26, Jan. 2002.

Tredwell et al., "A Sequential Vector Selection Algorithm for Controllable Bandwidth Motion Description Encoding" IEEE Sympos. Intell. Multimedia. Video & Speech Process, May 2001.

Czerepinski et al., "Matching Pursuits Video Coding: Dictionaries and Fast Implementation" IEEE Trans Circuit Systems Video Technology, vol. 10, No. 7, pp. 1103-1115, Oct. 2000.

Monro et al., "Visual Embedding of Wavelet Transform Coefficients" IEEE International Conference Image Process, pp. 186-189, Sep. 2000.

Neff et al., "Very Low-Bit-Rate Video Coding Based on Matching Pursuits" IEEE Trans. Circuits and Systems for Video Tech., vol. 7, No. 1, pp. 157-171, Feb. 1997.

Mallat et al., "Matching Pursuits with Time-Frequency Dictionaries" IEEE Trans. Signal Processing, vol. 41, No. 12, pp. 3397-3415, Dec. 1993.

Steffen et al., "Theory of Regular $M$-band Wavelet Bases" IEEE Transactions on Signal Processing, vol. 41, No. 12, pp. 3497-3511, Dec. 1993.

Shapiro, "Embedded Image Coding Using Zerotrees of Wavelet Coefficients" IEEE Transactions on Signal Processing, vol. 41, No. 12, pp. 3445-3462, Dec. 1993.

Ramchandran et al., "Best Wavelet Packet Bases in a Rate-Distortion Sense" IEEE Transactions on Signal Processing, vol. 2, No. 2, pp. 160-175, Apr. 1993.

Mallat, "A Theory for Multiresolution Signal Decomposition: The Wavelet Representation" IEEE Trans. Pattern Anal. Mach. Intel., vol. 11, No. 7, Jul. 1989.

Daubechies, "Orthonormal Bases of Compactly Supported Wavelets" Comm. Pure Appl. Math., vol. 41, pp. 909-996, 1988.

Choog Soo Park et al., "Lost Motion Vector Recovery Algorithm," Circuits and Systems, IEEE International Symposium on London, vol. 3, 1994, pp. 229-232.

International Search Report for Appln. No. PCT/US2008/002179, issued Aug. 20, 2008, 12 pgs.

Non-Final Office Action for U.S. Appl. No. 11/255,090, dated Dec. 15, 2008, 15 pgs.

International Search Report and Written Opinion for Appln. No. PCT/US2008/002101, dated Dec. 12, 2008, 13 pgs.

Cotter et al., "Application of Tree-Based Searches to Matching Pursuit," 2001 IEEE International Conference on Acoustics, Speech and Signal Processing, New York, NY, vol. 6, 7, May 2001, pp. 3933-3936.

Shoa et al., "Tree Structure Search for Matching Pursuit," Image Processing, 2005, vol. 3, 11, pp. 908-911.

Qiangsheng Liu et al., "A low-cost video encoder with matching pursuit," Intelligent Multimedia, Video and Speech Processing, May 2, 2001, pp. 502-505.

Yuan Yuan et al., "Improved Matching Pursuits Image Coding," Acoustics, Speech, and Signal Processing, 2005, vol. 2, 18, pp. 201-204.

International Search Report and Written Opinion for Appln. No. PCT/US2008/002100, dated Dec. 12, 2008, 14 pgs.

International Search Report for Appln. No. PCT/US2007/021302, dated Dec. 10, 2008, 5 pgs.

Haoxing Zhang et al., "A Hybrid Video Coder Based on H.264 with Matching Pursuits," Acoustics, Speech and Signal Processing, 2006, p. 889.

Yuan et al., "3D Wavelet Video Coding with Replicated Matching Pursuits," Sep. 11, 2005, Image Processing, pp. 69-72.

Monro et al., "Subband Adaptive Dictionaries for Wavelet/Matching Pursuits Image Coding," Oct. 8, 2006, Image Processing, p. 2136.

Chien-Kai et al., "Matching Pursuits Low Bit Rate Video Coding with Codebooks Adaptation," Jun. 5, 2000, Acoustics, Speech, and Signal Processing, pp. 408-411.

International Search Report for Appln. No. PCT/US2007/021303, dated Dec. 12, 2008, 5 pgs.

Rabiee et al., "Scalable Subband Image Coding with Segmented Orthogonal Matching Pursuit," Oct. 4, 1998, Image Processing, pp. 774-777.

Rabiee et al., "Low-bit-rate Subband Image Coding with Matching Pursuits," Visual Communications and Image Processing, vol. 3309, 1998, pp. 875-880.

Schmid-Saugeon et al., "Dictionary Design for Matching Pursuit and Application to Motion-Compensated Video Coding," 2004, IEEE Transactions on Circuits and Systems for Video Technology, pp. 880-886.

International Search Report for Appln. No. PCT/US2007/019297, dated Dec. 12, 2008, 5 pgs.

Non-Final Office Action for U.S. Appl. No. 11/422,316, mailed Dec. 4, 2008, 13 pgs.

Non-Final Office Action for U.S. Appl. No. 11/332,777, mailed Feb. 25, 2009, 6 pgs.

Final Office Action for U.S. Appl. No. 11/425,142, mailed Mar. 2, 2009, 18 pgs.

International Search Report for Appln. No. PCT/US2007/014181 issued Jan. 23, 2008, 1 pg.

David Salomon, "Data Compression: The Complete Reference," 1998, Springer, XP002464409, pp. 32-33.

Non-Final Office Action for U.S. Appl. No. 11/677,511, mailed Feb. 20, 2009, 23 pgs.

Final Office Action for U.S. Appl. No. 11/677,511, mailed Jul. 2, 2009, 28 pgs.

* cited by examiner

HIERARCHICAL UPDATE SCHEME FOR EXTREMUM LOCATION WITH INDIRECT ADDRESSING

BACKGROUND

The task of finding an extremum or extreme value (e.g., a maximum and/or minimum data value) of a data set is commonly undertaken using computing systems. For example, system performance may be evaluated by calculating a cost function over the ranges of P parameters yielding a P-dimensional data set of cost function values to be searched. It may be necessary to search the entire resulting data set at least once to find a desired number of extrema. If, however, one or more data values subsequently change, the entire data set may need to be searched again to find any new extrema.

Some applications, for example, some video encoding schemes, involve searching large data sets for extrema. Such data sets may be subject to repeated, sparse updating of the data values. Repeatedly searching the entirety of such updated data sets for new extrema wastes computing resources and may be too slow for many applications.

BRIEF DESCRIPTION OF THE DRAWINGS

Subject matter is particularly pointed out and distinctly claimed in the concluding portion of the specification. Claimed subject matter, however, both as to organization and method of operation, together with objects and features thereof, may best be understood by reference of the following detailed description if read with the accompanying drawings in which:

DETAILED DESCRIPTION

In the following detailed description, numerous specific details are set forth to provide a thorough understanding of a claimed subject matter. However, it will be understood by those skilled in the art that claimed subject matter may be practiced without these specific details. In other instances, well-known methods, procedures, components and/or circuits have not been described in detail.

Some portions of the following detailed description are presented in terms of algorithms and/or symbolic representations of operations on data bits and/or binary digital signals stored within a computing system, such as within a computer and/or computing system memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing may involve physical manipulations of physical quantities. Typically, although not necessarily, these quantities may take the form of electrical, magnetic and/or electromagnetic signals capable of being stored, transferred, combined, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing", "computing", "calculating", "determining" and/or the like refer to the actions and/or processes of a computing platform, such as a computer or a similar electronic computing device, that manipulates and/or transforms data represented as physical electronic and/or magnetic quantities and/or other physical quantities within the computing platform's processors, memories, registers, and/or other information storage, transmission, and/or display devices.

Figure 1:
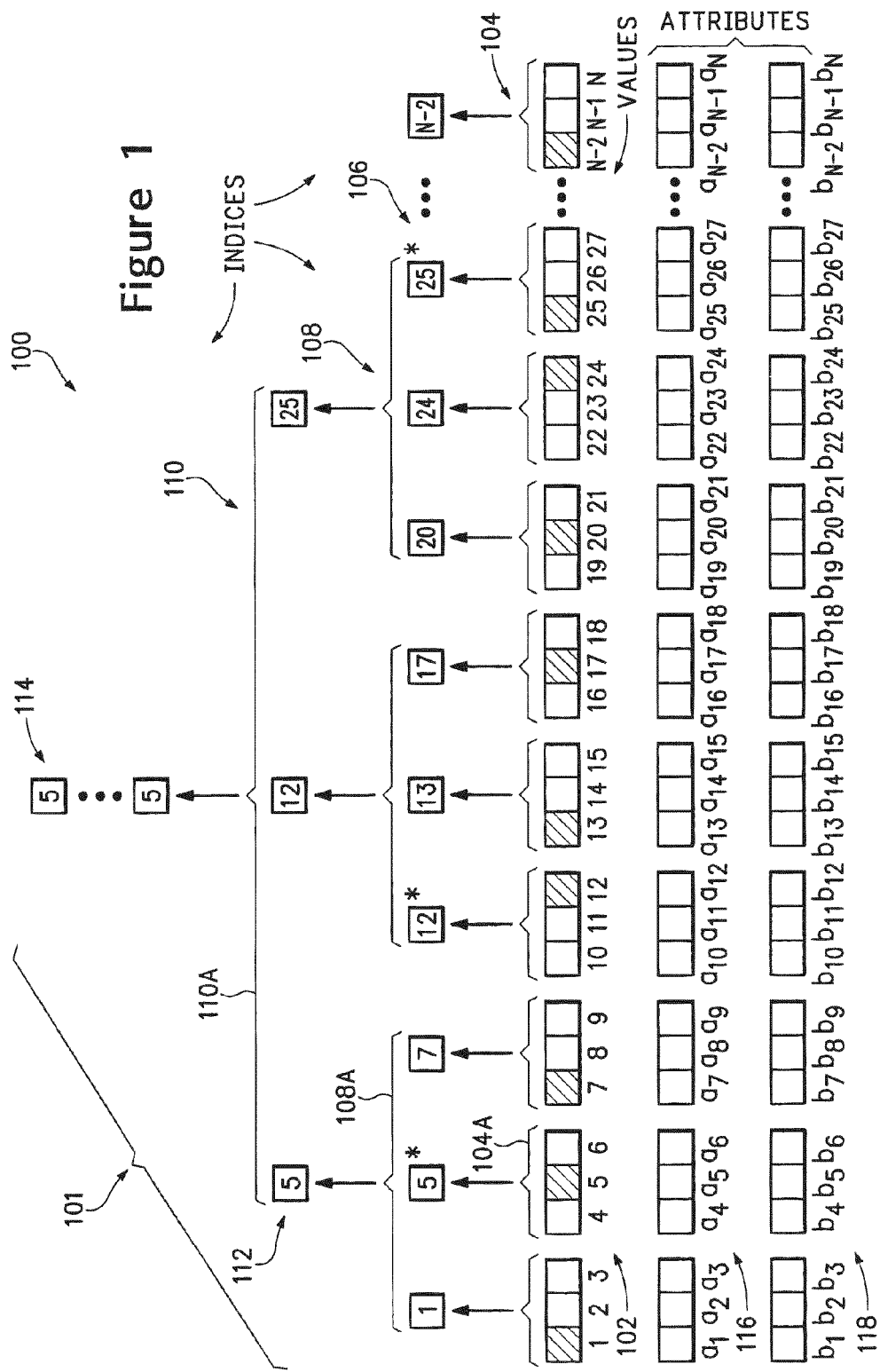
FIGS. 1-3 are conceptualizations of a hierarchical data structures.

FIG. 1 depicts an example scheme 100. Scheme 100 is presented for explanatory purposes and no arrangement, structure and/or illustration of any quantities and/or elements in FIG. 1 should necessarily be construed to limit claimed subject matter in any way.

In scheme 100, a data value hierarchy and/or hierarchical data structure 101 includes, at its base, a one-dimensional (1D) list and/or set 102 of N data values, labeled by position 1, 2, 3 . . . N, and divided into partitions 104 having a dimension and/or size S of three values each. Claimed subject matter is not, however, limited in scope to any specific partition size in set 102. Set 102 may also be referred to as a base level of structure 101, as base level data and/or a base level data set.

In accordance with some implementations of claimed subject matter, each value of level 102 may be associated by an index indicating a location and/or position of that value of base set 102. Thus, for example, an index "5" may be associated with or point to a data value at a $5^{th}$ position or location in set 102. Data values of set 102 may comprise, in some implementations, absolute values of inner products of image data with a dictionary or set of basis functions, although claimed subject matter is not limited by the type and/or form of data indexed.

Throughout this description and/or in the claims that follow the phrase "associated with" may be used interchangeably with the term "indicates", and/or the phrases "corresponds to," and/or "is indicative of" may be used to describe a relationship between two elements such as an index and a data value. Thus, for example, when an index of a base level of a data structure is described as being associated with a data value it may be understood that the index may be used to access or obtain a data value at a particular position in a data value set where that position is indicated by the index.

In accordance with some implementations of claimed subject matter, an index may indicate a location, position and/or address of a data value set 102 stored in an array of values. For example, values of set 102 may be stored in an array in memory and indices 106 may indicate locations or addresses of those values in memory. In other words, for particular values in set 102, for example, values at positions labeled "4" "5" and "6" in FIG. 1, indices pointing at those positions may indicate adjacent logical addresses in memory so that, for example, an index associated with a value of set 102 at position 5 may indicate a memory address logically adjacent to a memory address holding a value at position 4 in set 102. Likewise, indices 106 may be stored in an array in memory. Thus, in some implementations, values and/or indices of structure 101 may be stored as arrays in memory, although claimed subject matter is not limited in this regard. In some implementations, memory holding indices and/or values of structure 101 may comprise volatile memory such as Static Random Access Memory (SRAM) or Dynamic Random Access Memory (DRAM). In some implementations, memory holding indices and/or values of structure 101 may comprise non-volatile memory such as flash memory. In some implementations, memory holding indices and/or values of structure 101 may comprise one or more look-up tables (LUTs).

While pointing to positioning of values in set 102, indices may also be associated with additional data values and/or attributes associated with data values. Such attributes may likewise be stored in an array. For example, a set of attributes or pointers to a set of attributes may be stored in an attribute look-up table (LUT), where positioning or addresses of attributes within an attribute LUT mirrors or matches positioning of associated data values of set 102 in a data value LUT. In some implementations, an attribute LUT may store pointers to attributes. For example, a data value at position 5 in set 102 may be associated with a dictionary entry attribute, where that dictionary entry associates a basis function with the data value at position 5. An attribute LUT may then be used to store a pointer to a dictionary entry associated with a data value at position 5 of set 102 at a location or address in the attribute LUT between an address holding a pointer to a dictionary entry associated with a value at position 4 of set 102 and an address holding a pointer to dictionary entry associated with a value of position 6 of set 102. Hence, an index associated with a value at position 5 in set 102 may also comprise a lookup index to a $5^{th}$ logical address in one or more attribute LUTs. Those skilled in the art will recognize that attributes associated with values of set 102 may be stored within or across multiple LUTs, or that a logical translation table may be used to translate indices associated with values in set 102 into LUT addresses. claimed subject matter is not limited, however, to storage of attributes in LUTs. Thus, in some implementations, attributes and/or pointers to attributes may be stored in memory such as DRAM, SRAM, flash memory, etc.

In accordance with some implementations of claimed subject matter, to begin populating structure 101, a total of (S−1), or two, comparisons may be made among data values at positions in each partition 104 and indices associated with positions of subsequently identified extreme data values in partitions 104 may be carried into partitions 108 of a first level data set 106 in structure 101. Thus, indices populating level 106 may point to positions within set 102 associated with extreme data values in each partition 104. Thus, if values at positions 1, 5, 7, 12, 13, 17, 20, 24, 25 (shown hatched in FIG. 1) correspond to extrema of partitions 104 then associated indices may be carried into level 106 as shown.

If set 102 includes fifty-four data values divided into eighteen partitions 104, then a total of thirty-six comparisons (two within each partition) may be used to determine all extrema of partitions 104. In this sense, to populate partitions above base level 102 in structure 101, indices of upper levels may be used to indirectly address or access those values for comparison purposes. Such indirect addressing may take the form of using indices within upper level partitions as pointers to memory locations holding corresponding data values.

Thus, an index associated with an extreme data value in a partition 104, or an "extremum index" of that partition, may be carried into a corresponding partition 108 of first level set 106. Throughout this description and/or in the claims that follow, the phrases "carried into", "abstracted to", "be used to populate", and/or "be placed in" may all be used to describe movement of extrema indices from partitions of a lower level above a base level in a hierarchical data structure to a next higher level of that structure. Also, throughout this description and/or in the claims that follow, the term "extremum" and its plural form "extrema" may be used interchangeably with the respective phrases "extreme index" and "extreme indices."

Like partitions 104, partitions 108 of level 106 may hold three indices taken from three corresponding partitions 104. To populate a second level data set 112 of structure 101, a total of (S−1), or two, comparisons of data values pointed to by indices of each partition 108 may be undertaken, and indices associated with subsequently identified extreme data values of partitions 108 may be placed in partitions 110 of level 112. Thus, for example, if level 106 comprises eighteen indices divided into six partitions 108, then a total of twelve comparisons of associated data values, indirectly addressed using the indices, may be used to determine all extrema indices of partitions 108.

First level 106 may be described as a coarse representation of extrema of the base level partitions 104, while second level 112 may be considered a coarse representation of extrema of the first level partitions 108. In this sense, upper levels of structure 101 may be described as successively coarser representations of extrema where each successive level 106, 112, etc., may be formed by finding and storing extrema of a previous level's partitions. Hence, a hierarchical data structure in accordance with claimed subject matter may be described as a hierarchy of successively coarser representations comprising a hierarchy of arrays and/or a tree.

In general, for a base level set of N indices and for single values of S, a number of levels L in a data structure in accordance with some implementations of claimed subject matter may be provided by $$L=\log_S(N) \qquad (1)$$

Value L may comprise an integer if N comprises a power of S. For example, referring to structure 101 (S equal three), a number of levels L may be equal to $\log_3(N)$. Thus, for twenty-seven base level indices, structure 101 may have three levels in a scheme with a single partition size of three. While for eighty-one base level indices, structure 101 may have four levels in a scheme with a single partition size of three.

Claimed subject matter is not, however, limited to data structures having a specific number of levels and, thus, data structures in accordance with claimed subject matter may include as many levels as desired. For example, for a given number N of data values and hence indices, there may be a certain number of levels, not depicted in FIG. 1, between second level 112 and an apex 114 of structure 101.

It may be recognized that, in accordance with equation (1), for some combinations of N and S, a number of levels L in a data structure in accordance with some implementations of claimed subject matter may have non-integer values. In particular, if N does not comprise a power of S, L may not comprise an integer value and a next higher number of levels may be required to build a structure with a single apex. Thus, in some schemes, a penultimate level (i.e., the level below the apex) may not include a total of S indices. However, claimed subject matter is not limited to full hierarchical data structures having a number of levels consistent with equation (1). Thus, for example, in some implementations of claimed subject matter, data structures may be employed having less levels than would be consistent with equation (1). In addition, while FIG. 1 may illustrate a pyramidal data structure having same sized partitions in each level in accordance with some implementations of claimed subject matter, claimed subject matter is not limited in this regard and data structures with levels having different sized partitions $S_L$ may be employed in accordance with other implementations. Moreover, in accordance with some implementations of claimed subject matter, partitions within a level may be differently sized (e.g., may hold different numbers of indices).

Apex 114 of structure 101 may contain an index of set 102 pointing to a position in set 102 holding an extremum of set 102. Thus, an index in apex 114 may be termed an extremum index of data structure 101. A total of (N−1) comparisons among data values indirectly addressed by indices of structure 101 may be undertaken to initially populate structure 101 with extrema indices. For example, for a set 103 of fifty-four data values, a total of fifty-three comparisons made among those values may be required to populate apex 114 with an extremum index of set 102.

In some cases, for example, with a sufficiently large data value set, an extremum of the data may not be unique (i.e., the set may contain multiple identical extreme data values or extrema). In other words, a base level of a data structure in accordance with claimed subject matter may contain multiple extreme data values. Thus, in various implementations in accordance with claimed subject matter, it may be valid to carry any one of a plurality of extremum indices associated with a base level up to an apex of a data structure, to carry a specific one of the extremum indices (e.g., first, last, or using some other criteria for selecting an index to carry) up to an apex, or to carry all such extremum indices up to an apex of a data structure.

In accordance with some implementations of claimed subject matter and as noted above, each value of a base level set may be associated with one or more attributes. In other words, an index associated with a position of a data value in a base level may be used to indirectly address and/or access one or more data value attributes associated with that value. For example, in FIG. 1, two attribute sets are shown: a first set 116 of N attributes $(a_1, a_2, \ldots a_N)$ and a second set 118 of N attributes $(b_1, b_2, \ldots b_N)$ where any given $k^{th}$ pair $(a_k, b_k)$ of attributes in attribute sets 116 and 118 may be associated with a data value of set 102 pointed to by a single index. In accordance with some implementations of claimed subject matter, sets of 116 and 118 may comprise LUTs similar to that described above although claimed subject matter is not limited in this regard.

Claimed subject matter is not limited to any particular type and/or number of attributes and two attributes sets are shown in FIG. 1 simply to illustrate the principle. Attributes in accordance with some implementations of claimed subject matter may include, in the case of video data, an associated sign value of an inner product absolute value, a color value, or a dictionary entry for a basis function associated with a data value to name a few examples. Attributes in accordance with some implementations of claimed subject matter may also comprise an index associated with other attributes and/or a pointer indicating other attributes.

If a change of value occurs in one or more data values in a base level of a data structure in accordance with some implementations of claimed subject matter, then effort required to identify any new extremum among the data values may be limited to making comparisons among data values of base level partition(s) holding changed values. For example, referring to FIG. 1, if a value at position 5 in partition 104A changes, then comparisons among data values of partition 104A may be undertaken to see if partition 104A contains a new extremum index.

If no other data values change in set 102 then only comparisons among data values of partition 104A may need to be undertaken. Thus, in accordance with some implementations of claimed subject matter, a total of (S−1), or two, comparisons of data values of partition 104A would suffice to determine that partition's new extremum index if any. An index pointing to a new extremum index of partition 104A may then be carried into a corresponding partition 108A of level 106. For example, if changing a data value at position 5 results in a data value at position "6" of partition 104A becoming that partition's extreme data value, then an index associated with position 6 may be carried up into partition 108A. Likewise, (S−1), or two, comparisons of data values associated with indices of newly updated partition 108A may then be undertaken to determine if a corresponding partition 110A of level 112 needs to be updated with a new extremum index, and so on. Thus, similar in manner to how the entire structure 101 was initially populated as described above, and in accordance with some implementations of claimed subject matter, structure 101 may be subsequently updated with new extrema indices in any and/or all upper level partitions impacted by new extreme data values appearing in, any of partitions 104. For example, if changing one or more data values results in a data value at position 5 becoming a new extremum of set 102, then an index pointing to position 5 may be propagated all the way up through structure 101 and into apex 114 as shown in FIG. 1 displacing an old extremum index in the apex.

If, on the other hand, carrying an updated extremum index into partition 108A does not change that partition's extremum index then, in accordance with some implementations of claimed subject matter, updating of structure 101 may end and, hence, an extremum index in apex 114 may remain unchanged and/or no additional comparisons may be needed. If, on the other hand, an extremum index of partition 108A does change, then an extremum index of partition 110A may change as well and additional comparisons may be carried out.

In general, for N base level data values, a number of comparisons C undertaken to update and/or rebuild a pyramidal data structure when one base level data value changes may, in accordance with some implementations of claimed subject matter, be provided by $$C=(S-1)\log_S(N)=(S-1)L \tag{2}$$

where S and L are, again, partition size and number of levels in a pyramidal data structure. In accordance with some implementations of claimed subject matter, if data values in more than one base level partition change, then a data structure may be updated or rebuilt in a similar manner above all base level partitions associated with a changed data value.

While it may be convenient to choose values of N and S such that N comprises a power of S, claimed subject matter is not limited in this regard. Further, while a binary hierarchy and/or data structure having a partition size of two may minimize a number of comparisons required to populate or update a structure, claimed subject matter is not limited to specific partition sizes. Thus, for example, for a given set size N, larger values of S may be chosen in order to provide data structures having smaller values of L.

Although data structure 101 has been described as a full data structure having a numbers of levels L in accordance with equation (1), in other implementations of claimed subject matter, truncated hierarchical data structures having fewer levels may be employed. In such data structures, a top level or apex may contain multiple indices comprising extrema of a penultimate layer's partitions. In yet other implementations, when, for example, equation (1) provides non-integer values of L, data structures may include a number of levels consistent with a next higher integer value of L.

Figure 2:
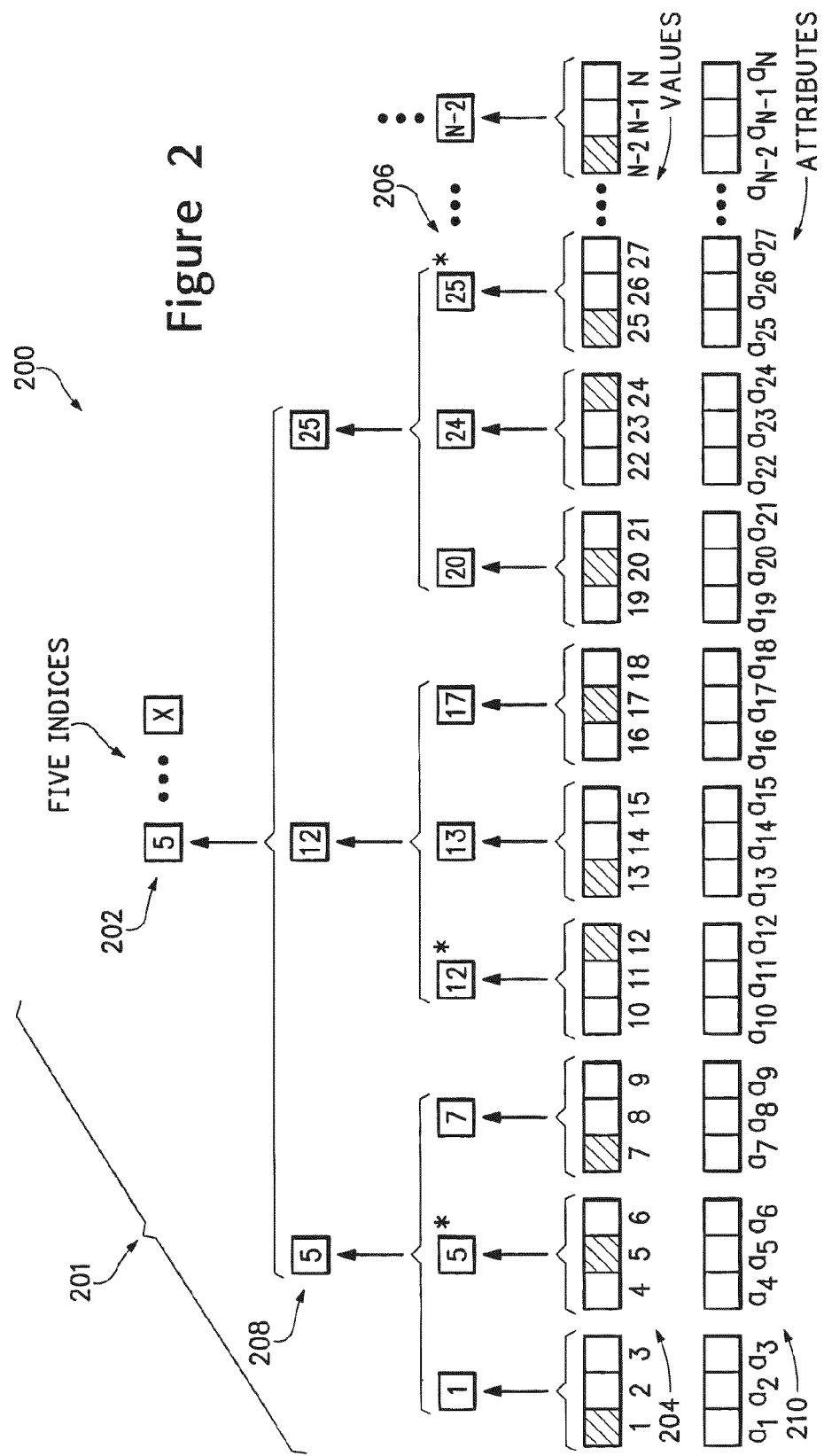

FIG. 2 is a diagram depicting an example truncated hierarchical data scheme 200. Scheme 200 is presented for explanatory purposes and no arrangement, structure and/or illustration of any quantities and/or elements in FIG. 2 should necessarily be construed to limit claimed subject matter in any way.

As FIG. 2 shows, a highest data level 202 of a truncated data structure 201 contains a set of extremum indices associated with positions of extrema in a base level 204 and carried up through first and second levels numbered 206 and 208 respectively. In structure 201, each of levels 204-208 have partition sizes of three while apex 202 has, in this example, a partition size of five. Because top level 202 of structure 201 contains more than one extreme index, structure 201 may provide a list or set of extrema rather than a single extremum index. However, implementations in accordance with claimed subject matter may employ various combinations of hierarchical data structures having various partition sizes and numbers of levels and data structures described herein represent only a small subset of possible hierarchical data structures in accordance with claimed subject matter.

As with scheme 100 of FIG. 1, each data value of set 204 of scheme 200 may also be associated with one or more attributes. Thus, in accordance with some implementations of claimed subject matter, indices associated with positions of data values in base level 204 may also be associated with or point to one or more attributes. In other words, indices associated with base level 204 may be used to access data attributes held, for example, in one or more LUTS. In this example, a single set of attributes 210 are associated with set 204. Again, claimed subject matter is not limited to any particular type and/or number of attributes and one set of attributes is shown in FIG. 2 simply to illustrate the principle.

Figure 3:
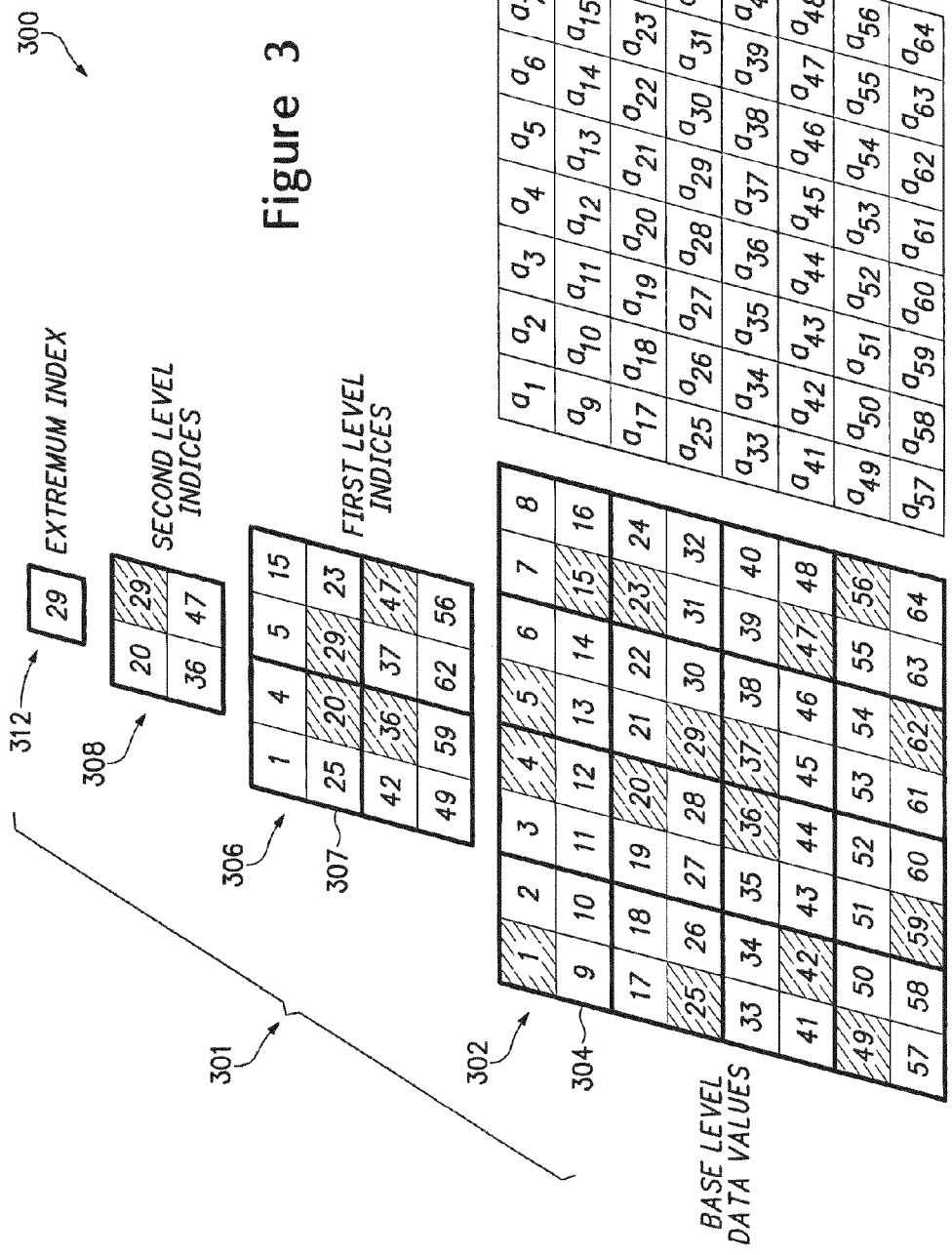

FIG. 3 is a diagram depicting an example scheme 300. Scheme 300 is presented for explanatory purposes and no arrangement, structure and/or illustration of any quantities and/or elements in FIG. 3 should necessarily be construed to limit claimed subject matter in any way.

Scheme 300, includes a two-dimensional (2D) data structure 301 having a 2D base level set 302 of sixty-four data values (e.g., numbered by positions 1-64) divided into sixteen two-by-two partitions 304 of four values each. Upper levels of structure 301 include a first level 306 holding a total of sixteen extrema indices, pointing to extreme data values of partitions 304, in four two-by-two partitions 308, a penultimate or second level 310 having a single partition holding four extrema of partitions 308, and an apex 312 holding an extremum index associated with an extreme data value of set 302.

While set 302 as shown comprises a regular rectangular array, claimed subject matter is not limited in this regard and base level sets having any number of data values arranged or grouped in any manner may be employed. Further, while set 302 is shown as a 2D set, and sets 102 and 204 of schemes 100 and 200 as 1D sets, claimed subject matter is not limited to base level sets of any particular dimensionality. Thus, for example, three-dimensional (3D) data structures in accordance with some implementations of claimed subject matter may be built above 3D base level data sets.

To build structure 301, an index associated with a position of an extreme data value (shown as hatched boxes in FIG. 3) in each of partitions 304 may be carried into a separate one of four two-by-two partitions 307 of first level 306. Thus, as shown in FIG. 3, each partition 307 contains four indices associated with four extreme data values of partitions 304 of set 302. Three comparisons may then be made among values associated with indices in each partition 307 to establish extremum indices of level 306 which may then be carried into second level 308.

Finally, three comparisons may then be made among values associated with indices of level 308 to establish an extremum index of level 308 which may then be carried into apex 312 of structure 301. In the example of FIG. 3, an index pointing to a value at position 29 in base level set 302 comprises an extremum index and has been carried into apex 312 by undertaking a total of sixty-three comparisons: three comparisons for each of sixteen partitions 304 to populate level 306 with indices, three comparisons for each of four partitions 307 to populate level 308 with indices, and, finally, three comparisons of data values associated with indices of level 308 to populate apex 312 with an extremum index pointing to a position of an extreme data value in set 302.

As with schemes 100 and 200 of FIGS. 1-2, and in accordance with some implementations of claimed subject matter, a data value of set 302 may be associated with one or more attributes. For example, in FIG. 3, a single attribute set 316 is shown comprising attributes $(a_1, a_2, \ldots a_{64})$ where a given attribute may be associated with a single one of the sixty-four data values of set 302.

If one or more data values in set 302 change, then updating of structure 301 may proceed in a manner similar to that described above with respect to schemes 100 and/or 201. If, for example, a changed data value results in a new extreme data value for set 302 then an index pointing at that value's position in set 302 may be propagated all the way to apex 312 to complete updating of structure 301 using a total of nine comparisons consistent with equation (2) where partition size is four. Again, each comparison may involve using two indices as pointers to access data values held at particular locations in, for example, memory, and then comparing those values to each other. As stated before with respect to schemes 100 and 200, and in accordance with some implementations of claimed subject matter, updating of structure 301 may be carried out in full, or updating may be terminated at a particular level if updating that level does not result in a new extremum or if a list of multiple extrema is sought.

While structure 301 may allow for nine comparisons to achieve full updating after a single data value changes, other schemes, such as 1D data structures similar, for example, to scheme 100 of FIG. 1, may be employed in accordance with some implementations of claimed subject matter to reduce a number of comparisons needed to determine a new extremum. For example, if values of 2D set 302 were to be transformed into a 1D set and a 1D data structure of associated indices having S=2 built over the 1D set, then this 1D data structure may be fully updated using only six comparisons after a single value changes.

If, however, two data values change, for example data values corresponding to positions 25 and 26 of set 302, then, depending on how 2D set 302 was transformed to generate a 1D base level data set, for example by scanning in some order, updating a 1D data structure of S=2 may require two stages of updating using twelve comparisons total. On the other hand, if the same two changes occur in scheme 300, where positions 25 and 26 occupy a same partition 304, then only one stage of updating may be required using, again, only nine comparisons. Clearly, there may be many ways, in accordance with claimed subject matter, to optimize how a base level data value set may be organized and/or how a hierarchical data structure may be organized overall in order to reduce the number of comparisons and/or stages of updating required, claimed subject matter not being limited in scope to any particular ordering of a base level set and/or hierarchical data structure.

In accordance with some implementations of claimed subject matter, a data value set may comprise data representative of image data, of video data, or of a signal such as an audio signal. Further, a base level set in accordance with some implementations of claimed subject matter may be 1D, 2D, 3D or of higher dimensionality. In addition, a data structure in accordance with some implementations of claimed subject matter may comprise a hierarchy of arrays, or a tree. Moreover, implementations in accordance with claimed subject matter may employ various combinations of hierarchical data structures having various partition sizes and numbers of levels, and the data structures described herein with respect to FIGS. 1-3 represent only a small subset of the possible hierarchical data structures or schemes in accordance with claimed subject matter.

Figure 4:
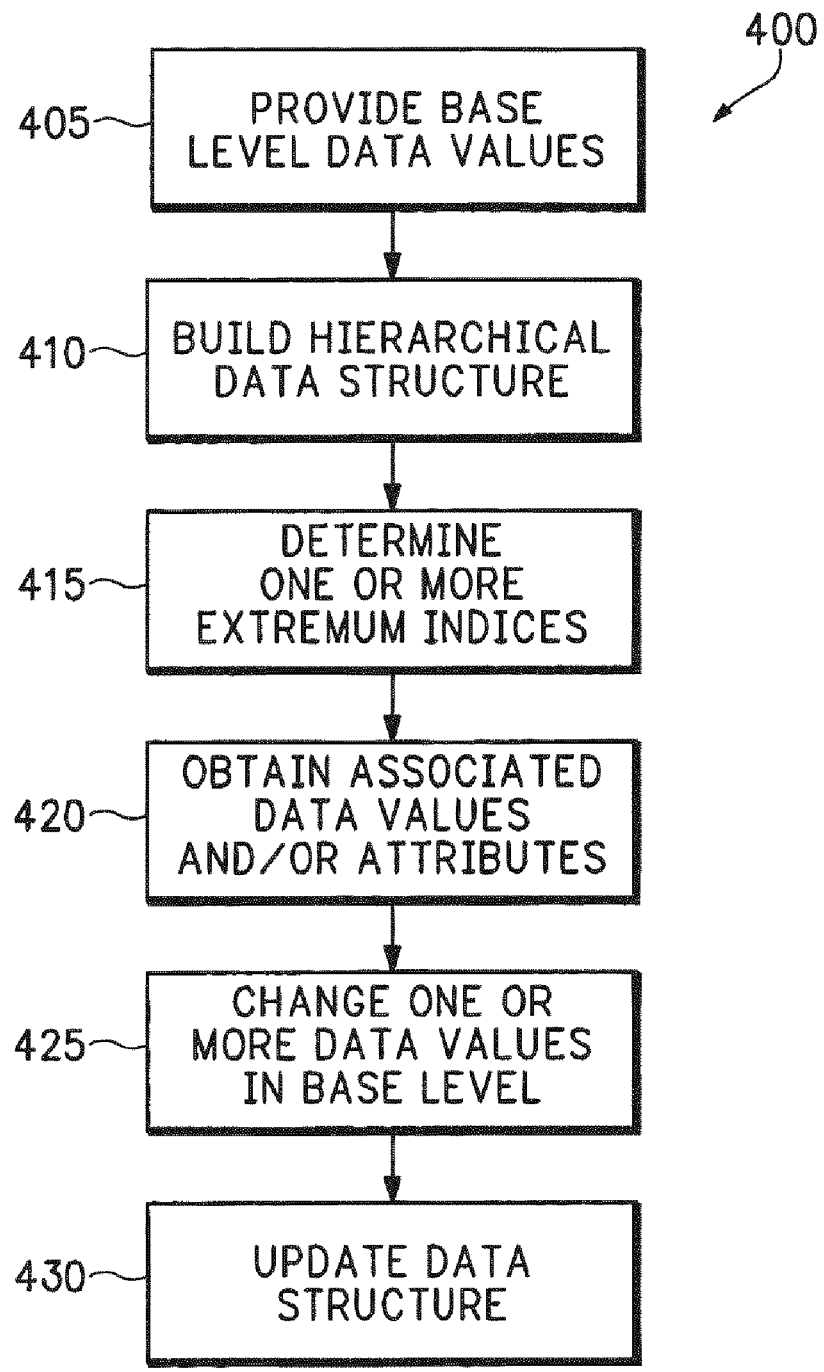
FIG. 4 is a flow diagram of a process for employing a hierarchical data structure.

FIG. 4 is a flow diagram of a process 400 for employing a hierarchical data structure. In block 405, a base level data value set may be provided and in block 410 a hierarchical data structure may be created having a base level comprising data values of a set received in block 405. For example, block 410 may involve creating a hierarchical data structure similar to structures 100, 201, and/or 301 as described above with respect to FIGS. 1-3. Block 410 may involve, for example, determining, given N data values in a base set of a particular dimensionality provided in block 405, a number of data levels L and partition size(s) $S_L$ for those levels. Data structure levels above a base level data set may then be populated with indices in a manner similar to that described above with respect to FIGS. 1-3 to complete block 410. In some implementations, an algorithm or process may be employed to map indices to an associated base level set of data values.

In block 415, one or more extreme indices may be determined. In some implementations of claimed subject matter, block 415 may be performed upon completion of block 410 when a top level of a data structure may be populated with one or more extreme indices. Thus, block 415 may include accessing one or more indices in a top level of a data structure created in block 410 and held, for example, in memory. At block 420, one or more extreme indices may be used to access or obtain associated data values of a base level set and/or data attributes in a manner similar to that described with respect to FIGS. 1-3. For example, if block 415 results in determination of a single extreme index, block 420 may include using that index as a lookup index or address to a storage location (e.g., a memory location) holding an associated data value. In some implementations, block 420 may include using an algorithm or process to map an index to an associated data value.

At block 425, one or more data values may be changed at positions in a base level data set of a data structure formed in block 410. Block 425 may involve one or more data values getting larger or smaller. If multiple values change then some values may increase in magnitude while others decrease in magnitude.

In block 430, a data structure may be updated. As described previously with respect to FIGS. 1-3, updating a data structure in accordance with some implementations may involve making comparisons among data values of base level partitions associated with data values altered in block 425, providing associated first level partitions with any indices pointing to new extrema of base level partitions, and then carrying that process forward in a similar manner for some if not all levels of a data structure.

Claimed subject matter is not, however, limited in scope in block 430 to updating an entire data structure and, thus, in some implementations, block 430 may involve updating a data structure only for those levels having new extrema. For example, some implementations may occur wherein changing one or more data values in block 430 does not result in a new overall extreme data value and thus updating of a data structure in block 430 may not be carried through to a highest level and/or apex. In other implementations, a set of extrema or multiple extreme indices may be sought rather than a single extreme index. In such implementations, updating in block 430 may also be terminated before a highest level and/or apex of a data structure.

Application to Video Encoding

Encoding video data may comprise an application suitable for employing hierarchical data structures in accordance with the claimed subject matter. In some video encoding schemes, algorithms, such as matching pursuits (MP) algorithms, may be employed to transform 2D image data into coded information describing the data in terms of various known signals or basis functions having discrete amplitudes.

An MP method was first described with respect to coding of raw 1D audio signals. See, for example, S. G. Mallat and Z. Zhang, "Matching pursuits with time-frequency dictionaries", *IEEE Trans. Signal Processing*, vol. 41, pp. 3397-3415, December 1993. MP methods have also been applied in 2D to video coding. See, for example, R. Neff and A. Zakhor, "Very low bit rate video coding based on matching pursuits" *IEEE Trans. Circuits and Systems for Video Tech.*, vol. 7, pp. 158-171, February 1997; and A. Zakhor and R. Neff, Method and apparatus for compression of very low bit rate video signals, U.S. Pat. No. 5,699,121, 16 Dec. 1997.

An MP algorithm may include repeatedly determining, for different locations or positions in a data set, full inner products between data to be coded and members of a dictionary of basis functions, and then identifying basis functions yielding largest inner products at different positions. At any particular position, a dictionary entry of an identified basis function may describe the data locally and may be termed an "Atom." To find a particular Atom, a maximum of absolute values of inner products may need to be identified. Amplitudes of Atoms thus identified may be quantized using one of any number of well-known quantization techniques, claimed subject matter not being limited in scope in this regard. For example, Atom amplitudes may be quantized using a Precision Limited Quantization (PLQ) method (see, for example, D. M. Monro, J-L Aufranc, M. A. Bowers and W Poh, "Visual embedding of wavelet transform coefficients", IEEE Int. Conf. Image Process. (ICIP 2000), September 2000), or some other method.

When initially undertaking an MP process in accordance with some implementations of claimed subject matter, a hierarchical data structure may be created or built over a base level data set comprising absolute values of inner products in a manner similar to that described above with respect to FIGS. 1-3.

Once identified using, at least in part, a data structure in accordance with some implementations of claimed subject matter and quantized, an Atom may be removed or subtracted from associated image data. Removing an Atom from a location in an image data set may change image data in a local region. Inner products may then be recomputed and another position and dictionary entry yielding a maximum absolute value of an inner product may be identified by, at least in part, updating a data structure in accordance with some implementations of claimed subject matter in a subsequent iteration of an MP process. Thus, data may be altered hundreds or thousands of times when coding using MP methods as successive Atoms are identified and removed, and a new search for a maximum absolute inner product may be carried out when identifying each Atom. It may be recognized that results of MP processing may be improved if a maximum of all absolute inner products are determined with each iteration or step of an MP process.

An iteration of an MP process may carry out new inner product calculations only in a locality where the image data has been changed as a result of a previous iteration. This may be termed 'repairing' inner products to those familiar with the field. Having repaired inner products in a locality, a next iteration of an MP method may include examining repaired inner products to determine, at each repaired position, a dictionary entry that provides a maximum absolute value. Doing so may result in a new quantized amplitude and dictionary entry for each repaired position. Newly determined quantized amplitudes may then, in accordance with implementations of claimed subject matter, be used to update a data set associated with indices of a hierarchical data structure. The hierarchical data structure may then be updated to locate a new extreme index and hence, via an associated inner product data value, a next Atom.

At any particular stage or iteration of an MP process, data being processed may be described by codes of Atoms found up to that stage, and a remaining data residual. However, when identifying and removing an Atom, a subset of inner products values may change in regions that overlap an area where a previous Atom has been subtracted from the image data. This region may be termed a "footprint" of a previous Atom and may span tens of image data pixels.

An MP process may be described in pseudocode as:

```
Initialize compute full set of inner products
Repeat
    Find Atom. Full search or reduced complexity strategy
    Atom Update. Subtract quantized Atom from image
    Repair. Recompute required inner products only in Atom footprint.
Until distortion or bit rate criterion met
```

Claimed subject matter is not, however, limited to a particular MP process such as described by the above pseudocode.

An MP process may be terminated at some stage and codes of a certain number of Atoms stored or transmitted by a further lossless coding process. Atoms used may describe a signal with some loss of information, while any unused Atoms plus a residual complete a signal's description. A lossless coding process employed may, for example, be a MERGE code employing PLQ quantization or some other method. See, for example, Yuan Yuan and Monro, D. M., "improved Matching Pursuits Image Coding", IEEE International Conference on Acoustics, Speech and Signal Processing ICASSP 2005, Philadelphia, March 2005. Claimed subject matter is not, however, limited in scope to any particular lossless coding process and/or quantization process. A decoder may reconstruct transmitted coded Atoms to form a lossy signal description.

For some implementations, a dictionary of basis functions may comprise 2D bases. Other implementations may employ dictionaries comprising 1D bases that can be combined separably to form 2D bases. A dictionary of n basis functions in one dimension may provide a dictionary of $n^2$ basis functions in two dimensions. In some implementations, 2D data, such as a portion of a frame of video data, may be transformed, for example by employing well-known scanning schemes, to yield a 1D signal and a 1D dictionary may be applied. In some implementations, a dictionary may comprise a set, group and/or collection of Gabor functions although claimed subject matter is not limited in scope in this regard.

To better understand application of some implementations of claimed subject matter to video encoding, an example MP implementation may be described with reference to scheme 300 although those skilled in the art may recognize that MP encoding may be performed using much larger data sets than set 302.

In some implementations, video data subjected to a MP process may comprise a portion or region of a video frame. In some implementations, video data may comprise a Displaced Frame Difference (DFD) image generated during motion compensation processing of a video frame. As described above, an MP process may include searching a data set comprising absolute values of inner products for new extrema. Thus, for example, set 302 may comprise a set of absolute inner product values determined for a region of image data where positions in set 302 may be pointed to by indices populating upper levels of structure 301. Claimed subject matter is not, however, limited in scope to inner products data or, for that matter, to any particular type of data, MP related video data or otherwise.

Thus, at a position of a maximum inner product value in set 302 identified by an extreme index of a hierarchical data structure in accordance with some implementations of claimed subject matter, a dictionary entry associated with that maximum inner product may describe video data locally. In this sense, a particular basis function (i.e., a dictionary entry) may be described as being associated with, and/or as representing video data associated with a location in set 302.

In some implementations, when a base level set, such as set 302, comprises maximum inner product values, attributes associated with those values (e.g., attributes in set 316) may comprise signs of the inner product values, code book entries associated with the inner product values, positions of the inner product values in set 302, etc. For example, in implementations where an attribute of a value in a base level set comprises a position or location of that value in the set, an index associated with that value and indicating positioning of that value in the base level set may also comprise an attribute of that value. For implementations with data structures having a 1D base level set, indices in upper levels of that structure may also comprise attributes directly indicating positioning of values in the base set. For implementations with data structures having 2D or higher dimension base level sets, indices in upper levels of that structure also comprise attributes indirectly indicating positioning of values in the base set where positioning may be determined given a particular size of the base level set.

In this manner, when employing a data structure in accordance with claimed subject matter, indices in upper levels of the data structure may indicate positioning of data values in a base level of the data structure. Moreover, while indices in upper levels of the data structure may be stored in one or more arrays in memory, attributes of the data values may be accessed using the indices without requiring creation of attribute arrays in memory.

Figure 5:
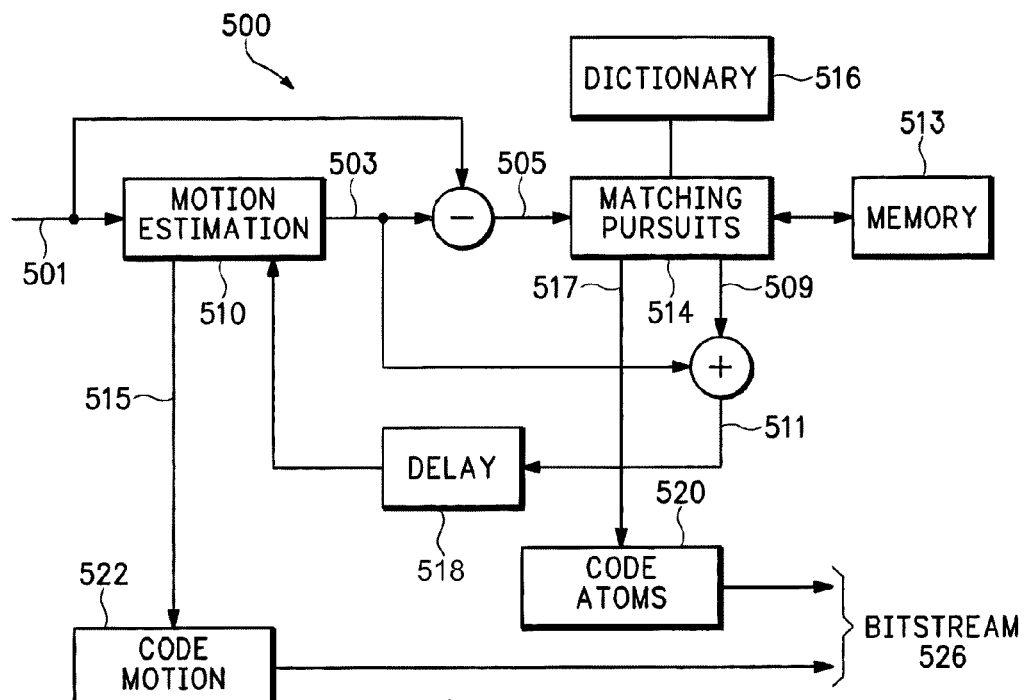
FIG. 5 illustrates an example encoding system.

FIG. 5 is a block diagram of an example video encoder and/or encoding system 500. Encoding system 500 may be included in any of a wide range of electronic devices, including digital cameras or other image forming devices, although claimed subject matter is not limited in this respect. System 500 may receive data 501 for a current original image. For this example implementation, current original image-501 may comprise a frame from a digital video stream or sequence of image frames. A motion estimation block 510 may receive current original image 501. Motion estimation block 510 may, in response to a reference or previous reconstruction image 513, perform motion compensation on image 501 to produce motion data 515 and prediction data 503. Motion data 515, which may include motion vectors and/or motion vector corrections, may be encoded by a code motion block 522 to produce coded motion data. Claimed subject matter is not limited in scope to any particular motion compensation method and/or any particular method used to encode motion data. Prediction data 503 may be subtracted from current original image data 501 to form an error or DFD image 505.

DFD image 505 may be received at an MP block 514. In some cases, DFD image 505 may be transformed before being provided to MP block 514. For example, DFD image 505 may be wavelet transformed before being provided to MP block 514. Claimed subject matter is not, however, limited to a particular type and/or format of data in general or in particular as provided to MP block 514.

MP block 514 may perform an MP process on DFD image 505 in a manner similar to that described above. In accordance with some implementations of claimed subject matter, MP block 514 may, in the process of MP encoding DFD image 505, use hierarchical data structures (e.g., pyramidal data structures similar to structure 301 of FIG. 3 ) to, for example, determine extreme absolute inner product values as successive Atoms are identified and removed from DFD image 505. In doing so, MP block 514 may store base level data values of the one or more hierarchical data structures in memory 513 coupled to MP block 514 and may access memory 513 to receive extrema and/or to update data values. Memory 513 may comprise any type of memory such as, but not limited to, Dynamic Random Access Memory (DRAM), Static Random Access Memory (SRAM), or the like. Further, in some implementations of claimed subject matter, MP block 514 may employ logic including comparator logic while using a hierarchical data structure to determine extreme indices. Those skilled in the art will recognize that comparator logic comprising one or more pyramidal arrays of comparators may be used to undertake comparisons of data values. Those skilled in the art may recognize that inner product data sets (e.g., inner product data sets derived from DFD image 505 may comprise much larger data sets than are shown in the example of FIG. 3. In particular, data set 302 may comprise extrema determined for all dictionary entries, and, in accordance with some implementations of claimed subject matter, hierarchical data structure 301 may be used to determine a global positional extremum 312 for set 302. Moreover, when identifying indices pointing to positions of extreme inner product values, MP block 514 may also employ one or more LUTs (not shown) holding attributes of associated inner product values.

MP block 514 may use a dictionary 516 to construct a series of Atom parameters 517 which may be delivered to a code Atoms block 520. Atom parameters 517 may, for example, comprise one or more of the data attributes held in LUTs (not shown). Code Atoms block 520 may encode the Atom parameters using any of a wide range of encoding techniques, claimed subject matter not being limited in scope in this regard. MP block 514 may also produce a coded residual 509 that may be added to the motion prediction information 503 to form a current reconstruction image 511 corresponding to current image data. Image 511 may be delayed by a delay block 518 before being provided to motion estimation block 510 as a previous reconstruction image 513 to be used in connection with motion estimation operations for a next original image.

Coded Atoms from block 520 and coded motion data from block 522 may be formed into a bitstream 526 that, in turn, may be transmitted to any of a wide range of devices, such as devices incorporating video decoders, using any of a wide range of interconnect technologies, including wireless interconnect technologies, the Internet, local area networks, etc., although claimed subject matter is not limited in this respect.

The various blocks and units of encoding system 500 may be implemented using software, firmware, and/or hardware, or any combination of software, firmware, and hardware. Further, although FIG. 5 depicts an example system having a particular configuration of components, other implementations are possible using other configurations. In addition, while FIG. 5 is directed to a video encoding system, claimed subject matter is not limited to video encoding applications, and, thus, other systems adapted for the encoding of still images or for the encoding of audio signals, to name two examples, may, in accordance with other implementations of claimed subject matter, employ hierarchical data structures holding indices associated with data values to determine extrema.

Figure 6:
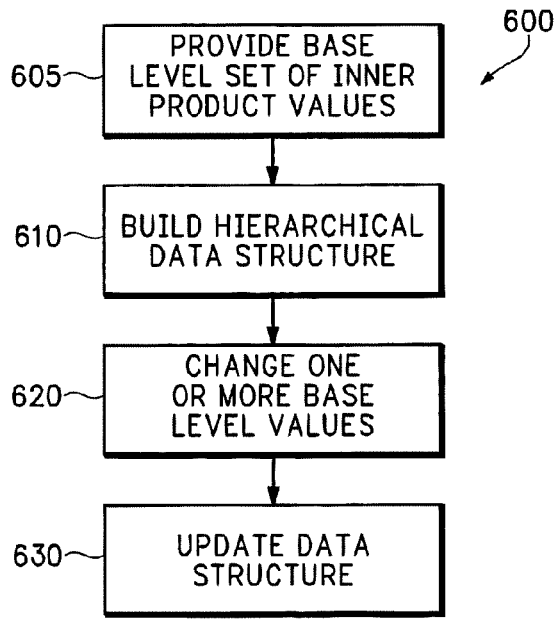
FIG. 6 is a flow diagram of a process for employing a hierarchical data structure scheme for video encoding.

FIG. 6 is a flow diagram of a video coding process 600. In block 605, a base level set of video data values may be provided. A data set provided in block 605 may comprise a set similar to set 302 of FIG. 3 and may comprise absolute inner product values determined in an MP process, although claimed subject matter is not limited in this regard. Thus, referring to FIGS. 3 and 5, block 610 may, for example, involve having MP block 514 employ logic to, in part, determine inner product values over a dictionary of basis functions for a set of image data such as DFD image 505 and then provide absolute values of those inner products as set 302.

At block 610, a hierarchical data structure may be built over a base set received in block 605. For example, referring to FIGS. 3 and 5, block 610 may involve having MP block 514 divide set 302 in partitions 304, determine a number of levels L and associated partition sizes $S_L$, and employ logic to, in part, compare inner product values within base level partitions to initially populate a hierarchical data structure with extreme indices.

While scheme 300 may provide a useful example, those skilled in the art may recognize that common video data applications may involve much larger data sets than set 302. For example, in television broadcasting, a set of image data may comprise 720 horizontal by 560 vertical rows of pixel data yielding a data set of 414,720 pixel values. MP encoding of such video data may entail searching for extreme data values in a number of inner product data sets each having 414,720 inner product data values derived from those pixel values. Thus, in some implementations, schemes in accordance with claimed subject matter may employ a plurality of data structures each having a base level data set of 414,720 absolute inner product values. However, this is only one example image data set size, there being many possible image data set sizes, and claimed subject matter is not limited to any particular base level data set size whether comprising video data or any other data.

For example, referring also to FIG. 5, in block 610, MP block 514 may determine a base level of 414,720 inner product data values by calculating absolute values of inner products of 414,720 pixel values with a dictionary of basis functions. Subsequently, higher levels of a data structure may be populated with indices by defining partitions, comparing data values within each partition, and so on as described previously above with respect to FIGS. 1-3. In undertaking block 610, MP block 514 may store base level data values and/or indices of data structure(s) in memory 513, and/or any associated attributes such as dictionary entries in one or more LUTs (not shown).

At block 620, one or more of the inner product data values may be changed. For example, block 620 may occur when MP block 514, performing an MP process, subtracts an Atom from image data and repairs affected inner products, and thereby alters one or more values.

Those skilled in the art may recognize that a size of a footprint generated by subtracting an Atom may depend on a size or extent of basis functions employed in an MP process. For example, if a maximum basis size of an MP basis function comprises nine pixel units, then, when an Atom is subtracted from an image, a total of eighty-one pixel values may be altered. However, because of overlap between inner product determinations, inner product values over a larger 17×17 window, or a 289-pixel region, in this example, may change when an Atom is removed from image data. Those skilled in the art may further recognize that repairing an affected region may involve calculating new inner product values in that affected region and best matching basis functions may then be determined for each location in a repaired region. Thus, in this example, block 630 may involve changing amplitudes of 289 data values out of 414,720 values when an Atom is subtracted from image data.

In block 630 the data structure may be updated. As described previously with respect to FIGS. 1-3, updating a data structure in accordance with some implementations of claimed subject matter may involve making comparisons among data values within base level partitions, providing associated partitions of first level partitions with any indices pointing to new extrema of base level partitions, and then carrying that process forward in a similar manner for some if not all levels of a data structure.

For a pyramidal two-dimensional hierarchical data structure, similar to structure 301, having a 2×2 partition size but a base set of 414,720 data values, a total of ten levels above a base level may need to be updated in block 630 if one or more data values change in block 620.

Continuing the example, if 289 data values change in block 620, MP block 514 may need to search data values of eighty-one partitions out of a total of 103,680 partitions in a base level. In other words, in block 630, MP block 514 may continue performing an MP process by comparing four data values associated with each of eighty-one base level partitions to determine if any of those partitions contain new extreme data values. Hence, updating eighty-one partitions may require a total of 243 comparisons. If some base level partitions contain new extreme data values, then, given a particular data structure used in this example, MP block 514 may need to examine a total of twenty-five of 25,920 first level partitions by using seventy-five comparisons to search for any new extremum indices on that level. As long as performing comparisons among data values associated with indices of one level results in one or more new extremum indices on that level, then updating of a data structure may continue in block 630 with updating of corresponding partitions of a next higher level. If updating a specific level does not result in any new extrema in that level's partitions then updating of a data structure in block 640 may end with that level.

Overall, using this example, if changing 289 base level data values in block 620 result in a new extreme value then, after data values associated with eighty-one partitions are examined in a base level, data values associated with twenty-five partitions may be searched at a first level, nine at a second level, four at a third level, and one at each level thereafter yielding a total of 375 comparisons in block 630 to identify an index associated with a new extreme value in 414,720 total data values. Without benefit of claimed subject matter, establishing an index associated with a new extreme data value may require a total of (N−1), or 414,719, comparisons.

Again, claimed subject matter is not limited in block 630 to updating an entire data structure and, thus, in some implementations block 630 may involve updating upper levels of a data structure only for those levels having new indices. For example, some implementations may occur wherein changing one or more data values in block 620 does not result in a new overall extremum data value and thus updating of a data structure in block 630 may not be carried through to a highest level and/or apex of the data structure. In other implementations, a set of indices pointing to multiple extreme data values may be sought. In these implementations, updating in block 630 may also be terminated before a highest level and/or apex of a data structure.

Figure 7:
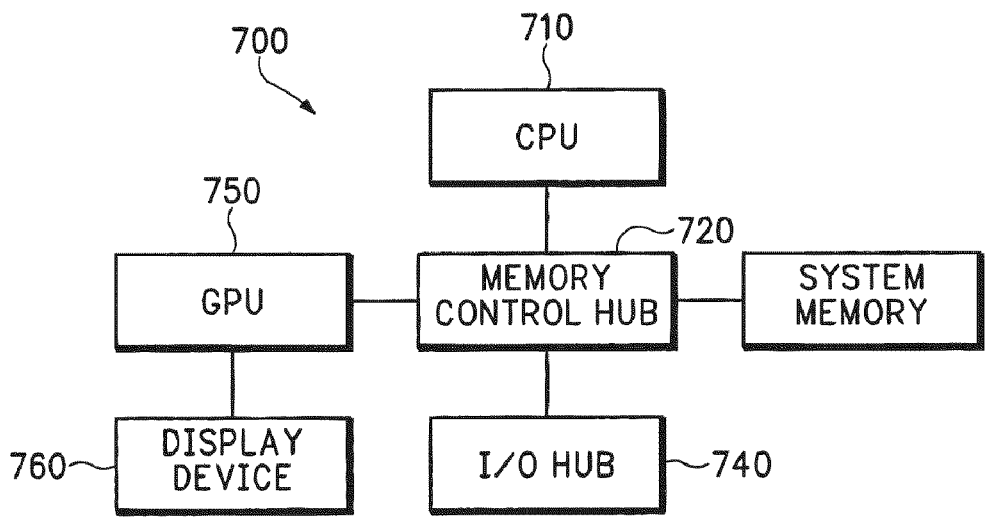
FIGS. 7-8 illustrate example systems.

FIG. 7 is a block diagram of an example computer system 700. System 700 may be used to perform some or all of the various functions discussed above in connection with FIGS. 1-6. System 700 includes a central processing unit (CPU) 710 and a memory controller hub 720 coupled to CPU 710. Memory controller hub 720 may further coupled to a system memory 730, to a graphics processing unit (GPU) 750, and to an input/output hub 740. GPU 750 may be further coupled to a display device 760, which may comprise a Cathode Ray Tube (CRT) display, a Liquid Crystal Display (LCD) flat panel display, or other type of display device. Although example system 700 is shown with a particular configuration of components, other implementations are possible using any of a wide range of configurations.

Figure 8:
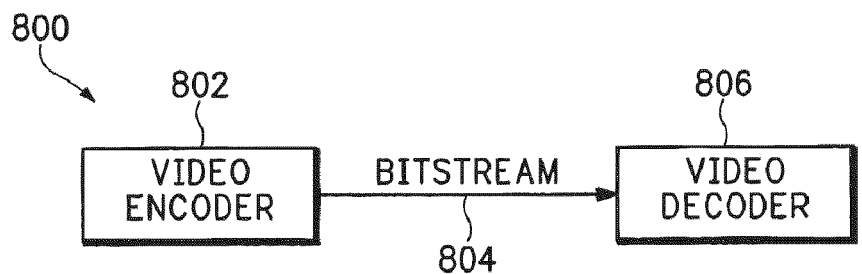

FIG. 8 is a block diagram of an example video transmission system 800. System 800 includes a video encoder 802 (e.g., system 700) that may transmit or convey information 804 (e.g., in a bitstream) to a video decoder 806 (e.g., system 700) where that information includes video data that has been compressed using an encoding process that employs hierarchical data structures in accordance with some implementations of claimed subject matter. For example, encoder 802 may, in accordance with some implementations of claimed subject matter and while employing an MP process in an encoding scheme to generate information 804, use data structures having base sets of inner product absolute values to determine inner product extrema. Although example system 700 is shown with a particular configuration of components, other implementations are possible using any of a wide range of configurations.

It will, of course, be understood that, although particular implementations have just been described, claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with claimed subject matter being executed, such as one of the implementations previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive.

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations. Also, as used herein, the article "a" includes one or more items. Moreover, when terms or phrases such as "coupled" or "responsive" or "in response to" or "in communication with" are used herein or in the claims that follow, these terms should be interpreted broadly. For example, the phrase "coupled to" may refer to being communicatively, electrically and/or operatively coupled as appropriate for the context in which the phrase is used.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now, or in the future, occur to those skilled in the art. It is, therefore, to be understood that the appended claims are intended to cover all such modifications and/or changes as fall within the true spirit of claimed subject matter.

What is claimed:

1. A method for generating data comprising:
   partitioning, by a processing device, a base level of data values into first partitions, wherein the data values are stored in memory;
   generating, by the processing device, a first level including second partitions, each of the second partitions including an index indicating a position of an extreme data value from each of the first partitions;
   generating, by the processing device, an apex including at least one extreme index from the second partitions of the first level that also corresponds to an extreme data value of the base level; and
   updating, by the processing device, the first level if at least one partition of the first partitions receives a new extreme data value, wherein the new extreme index is stored in the apex if altering at least one data value results in a new extreme data value of the base level.

2. The method of claim 1, further comprising:
   generating, by the processing device, a second level, the second level including third partitions, each respective one of the third partitions including extreme indices of corresponding ones of the second partitions.

3. The method of claim 1, wherein the indices are associated with attributes of the data values of the base level.

4. The method of claim 3, wherein attributes of data values comprise one of dictionary entries of Atoms, quantized amplitudes of Atoms, sign values, or color values.

5. The method of claim 1, wherein the data values of the base level comprise two-dimensional data.

6. The method of claim 5, wherein the data values of the base level are representative of image data or video data.

7. The method of claim 1, wherein the data values of the base level comprise one-dimensional data.

8. The method of claim 7, wherein the data values of the base level are representative of audio data.

9. The method of claim 1, wherein the data comprises a hierarchy of arrays or a tree.

10. The method of claim 1, wherein the first partitions include different numbers of the data values.

11. The method of claim 1, further comprising:
    storing, by the processing device, indices of the second partitions in memory.

12. The method of claim 1, wherein the data values of the base level comprise absolute values of inner products determined in a matching pursuits process.

13. The method of claim 1, wherein the data values of the base level are representative of a Displaced Frame Difference (DFD) image.

14. The method of claim 1, wherein the data values of the base level comprise one of three-dimensional data or greater-than-three-dimensional data.

15. A method, comprising:
    partitioning, by a computing device, a set of data values into one or more partitions in memory;
    generating, by the computing device, a coarse representation of extrema of each of the one or more partitions of the set of data values and storing indices indicative of locations of extrema in the partitions in memory; and
    updating, by the computing device, the coarse representation in response to altering one or more data values of the set of data values,
    wherein the updating comprises storing in memory indices indicative of locations of any new extrema in partitions from the one or more partitions of the set of data values that include altered data values.

16. The method of claim 15, further comprising:
    generating, by the computing device, a hierarchy of successively coarser representations of extrema;
    storing in memory indices indicative of locations of extrema of a previous level's partitions;
    updating, by the computing device, the hierarchy from a base level to a highest level for partitions of a base level data containing altered data values; and
    identifying, by the computing device, extrema of a base level data by processing an index held in the highest level of the hierarchy.

17. The method of claim 16, wherein the hierarchy of successively coarser representations comprises a hierarchy of arrays or a tree.

18. The method of claim 16, wherein the hierarchy of successively coarser representations comprises a hierarchy of levels, wherein each level above the base level includes indices indicative of locations of extrema of a next lower level, the method further comprising:
    partitioning, by the computing device, each level, wherein partitions comprise different numbers of indices within levels of the hierarchy and between different levels of the hierarchy.

19. The method of claim 15, wherein the partitions include two or more data values.

20. The method of claim 15, wherein the set of data values comprise data values representative of at least one of image data, video data, and signal data.

21. The method of claim 20, wherein the signal data comprises audio data.

22. The method of claim 15, wherein the set of data values comprise one-dimensional data.

23. The method of claim 15, wherein the set of data values comprise two-dimensional or more than two-dimensional data.

24. The method of claim 15, wherein the set of data values comprise absolute values of inner products determined by a matching pursuits process.

25. The method of claim 15, wherein the set of data values is representative of a Displaced Frame Difference (DFD) image.

26. The method of claim 15, wherein the set of data values comprises one of dictionary entries of Atoms, quantized amplitudes of Atoms, sign values, or color values.

27. A method, comprising:
partitioning, by a computer-based device, a set of data values into a plurality of first partitions;
storing, by the computer-based device, a set of first indices corresponding to positions of extreme data values of the first partitions;
altering, by the computer-based device, one or more data values to produce one or more altered first partitions; and
updating, by the computer-based device, indices of the set of first indices corresponding to the one or more altered first partitions.

28. The method of claim 27, wherein the storing comprises:
storing, by the computer-based device, the set of first indices in memory.

29. The method of claim 27, wherein the updating comprises:
storing, by the computer-based device, one or more of indices of the set of first indices in memory.

30. The method of claim 27, further comprising:
partitioning, by the computer-based device, the set of first indices into a plurality of second partitions; and
storing, by the computer-based device, a set of second indices corresponding to indices of the second partitions associated with extreme data values.

31. The method of claim 30, wherein the altering comprises:
updating, by the computer-based device, indices of the set of second indices corresponding to the one or more altered second partitions.

32. The method of claim 27, wherein the updating comprises comparing data values of the one or more altered first partitions.

33. The method of claim 27, wherein the updating comprises replacing one or more indices of the set of first indices with one or more new indices corresponding to positions of extreme data values in the one or more altered first partitions.

34. The method of claim 27, wherein the set of data values is representative of at least one of image data, video data, and audio data.

35. The method of claim 27, wherein the set of data values comprises one-dimensional data, two-dimensional data, or more than two-dimensional data.

36. The method of claim 27, wherein the set of data values is representative of a Displaced Frame Difference (DFD) image.

37. The method of claim 27, wherein the set of data values comprises one of dictionary entries of Atoms, quantized amplitudes of Atoms, sign values, or color values.

38. An apparatus, comprising:
an encoder, including a digital device, configured to use a hierarchical data structure to identify an extremum of a data set, wherein the hierarchical data structure holds indices corresponding to extreme data values of the data set, and wherein the hierarchical data structure comprises:
a base level including data values of the data set partitioned into first partitions;
a first level including indices pointing to extreme data values of the first partitions;
an apex including at least one index pointing to an extreme data value of the first level corresponding to an extremum of the base level; and
wherein the encoder is further configured to update the hierarchical data structure in response to a new extremum being saved in the base level.

39. The apparatus of claim 38, wherein the encoder is further configured to update the hierarchical data structure in response to a new extremum of the data set by storing an index associated with the new extreme data value in the first level.

40. The apparatus of claim 38, wherein the encoder is further configured to update the hierarchical data structure in response to a new extremum of the data set by storing an index associated with the new extreme data value in the apex if the new extreme data value comprises a new extremum of the base level.

41. The apparatus of claim 38, wherein the encoder is further configured to:
partition the first level into second partitions; and
generate a second level of the hierarchical data structure, the second level including extreme indices of the second partitions.

42. The apparatus of claim 38, wherein the base level comprises data values representative of one of image data, video data, or audio data.

43. The apparatus of claim 38, wherein the base level comprises one of one-dimensional data, two-dimensional data, or three-dimensional data.

44. The apparatus of claim 38, wherein the first partitions include different numbers of the data values.

45. The apparatus of claim 38, wherein the indices are associated with attributes of the data values of the base level of the hierarchical data structure.

46. The apparatus of claim 45, wherein the attributes of data values comprise one of dictionary entries of Atoms, quantized amplitudes of Atoms, sign values, or color values.

47. The apparatus of claim 45, wherein the attributes of data values comprise positions of data values in the base level.

48. The apparatus of claim 38, further comprising:
memory, wherein the encoder is further configured to store extreme data values of the first partitions in the memory.

49. The apparatus of claim 38, wherein the base level comprises absolute values of inner products determined in a matching pursuits process.

50. The apparatus of claim 38, wherein the hierarchical data structure further comprises a hierarchy of arrays or a tree.

51. The apparatus of claim 38, wherein the data set is representative of a Displaced Frame Difference (DFD) image.

52. A tangible computer-readable medium having stored thereon, computer-executable instructions that, if executed by a machine, cause the machine to perform a method comprising:
partitioning a base level of data values into first partitions;
generating a first level including second partitions, each of the second partitions including indices indicating positions of a respective extreme data value of corresponding ones of the first partitions;
generating an apex including an extreme index of the first level corresponding to an extreme data value of the base level; and
modifying the first level in response to at least one of the first partitions receiving a new extreme data value, wherein the new extreme index is stored in the apex if the new extreme data value results in a new extreme data value of the base level.

53. The tangible computer-readable medium of claim 52, containing further computer-executable instructions that, if executed by the machine, cause the machine to perform a method comprising:

generating a second level of the data including third partitions, each of the third partitions including respective extreme indices of a corresponding one of the second partitions.

54. The tangible computer-readable medium of claim 52, wherein the indices are associated with attributes of the data values of the base level.

55. The tangible computer-readable medium of claim 54, wherein attributes of data values comprise one of dictionary entries of Atoms, quantized amplitudes of Atoms, sign values, or color values.

56. The tangible computer-readable medium of claim 54, wherein attributes of data values comprise positions of data values in the base level of the data structure.

57. The tangible computer-readable medium of claim 52, wherein the base level comprises data values representative of one of image data, video data, or audio data.

58. The tangible computer-readable medium of claim 52, wherein the data structure comprises a hierarchy of arrays or a tree.

59. The tangible computer-readable medium of claim 52, wherein the first partitions include different numbers of data values.

60. The tangible computer-readable medium of claim 52, containing further computer-executable instructions that, if executed by the machine, cause the machine to perform a method comprising:

storing indices of the second partitions in memory.

61. The tangible computer-readable medium of claim 52, wherein the base level comprises absolute values of inner products determined in a matching pursuits process.

* * * * *